(12) United States Patent
Munshi

(10) Patent No.: US 6,426,863 B1
(45) Date of Patent: Jul. 30, 2002

(54) ELECTROCHEMICAL CAPACITOR

(75) Inventor: M. Zafar A. Munshi, Missouri City, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 0 days.

(21) Appl. No.: 09/449,443

(22) Filed: Nov. 25, 1999

(51) Int. Cl.$^7$ ................................................ H01G 9/00
(52) U.S. Cl. ....................................... 361/503; 361/504
(58) Field of Search ............................ 361/503, 504, 361/505, 508, 511, 525, 527

(56) References Cited

U.S. PATENT DOCUMENTS

| | | | |
|---|---|---|---|
| 5,419,977 A | * 5/1995 | Weiss et al. | 429/7 |
| 5,426,561 A | * 6/1995 | Yen et al. | 361/502 |
| 5,563,765 A | * 10/1996 | Lian et al. | 361/503 |
| 5,661,629 A | * 8/1997 | MacFarlane et al. | 361/505 |
| 5,748,439 A | * 5/1998 | MacFarlane et al. | 361/525 |

* cited by examiner

Primary Examiner—Anthony Dinkins

(57) ABSTRACT

An electrochemical capacitor includes an ionically conductive polymer thin film, a liquid electrolyte absorbed in the polymer thin film, and thin flexible active electrode layers constituting anode and cathode composed of energy dense material of high intrinsic surface area positioned at either side of the electrolyte-retaining polymer thin film to tightly sandwich it between the electrode layers. In one embodiment, the capacitor includes a polymer electrolyte in which a polymer thin film is cast from the base polymer and impregnated with the electrolyte solution, which contains a salt for ionic conduction. In another embodiment, the base polymer material includes an ionically conducting polymer, a perfluorocarbon polymer backbone to which sulfonic acid sites are permanently anchored. The energy dense material of the electrode layers may be physically mixed with battery active material to enhance the capacity and discharge time of the capacitor. In fabrication, the electrode material is reduced to particle size suitable for application to a thin film metallized polymer substrate, and applied directly and adherently on opposite sides of the substrate by injection, spraying, or evaporation, and a final thin flexible film of each electrode is formed with a desired thickness by use of rods if a slurry, or by controlling the extent of spray or evaporation, followed by curing. In another embodiment, the electrode elements are laminated directly onto opposite sides of a single- or double-metallized polymer substrate.

31 Claims, 3 Drawing Sheets

ELECTROCHEMICAL CAPACITOR

BACKGROUND OF THE INVENTION

The present invention relates generally to electrochemical double-layer capacitors, and more particularly to structure and method of manufacture of such capacitors utilizing polymer electrolytes with increased energy and power densities, improved stability, lower leakage, lower manufacturing cost and improved form factor.

Increase in volumetric energy density, high cycle life, greater reliability and low cost are some of the most important requirement for capacitors utilized in various military and commercial applications. Conventional dielectric capacitors such as plastic film capacitors and ceramic capacitors can accumulate and deliver electric charge very rapidly, i.e. they can operate in pulse mode with pulse widths in the nanosecond (ns) scale. However, their charge storage capability is rather poor compared to electrochemical capacitors. A dielectric capacitor with planar metal plates has capacitance in the range of pico to nano farads (pF, nF, resp.) per square centimeter ($cm^2$) (B. E. Conway, Journal of the Electrochemical Society, Volume 138, p. 1539, (1991); I. D. Raistrick, Electrochemical Capacitors, LA-UR-90-39 (January 1990); B. E. Conway, "Electrochemical Supercapacitors: Scientific Fundamentals and Technological Applications" Kluwer Academic/Plenum Publishers (1999).

Plastic film capacitors can be tailored for very high voltages simply by adjusting the film or dielectric thickness in the capacitor. The energy density of commercial film capacitors based on polyester or polypropylene is less than 1 joule per cubic centimeter (J/cc). Impregnated film capacitors have a very narrow operating temperature range while the metallized version can operate up to 100° C. with the exception of polyphenylene sulfide and Teflon™ that can reach an operating temperature range of 200° C.

Ceramic capacitors have an attractive form factor, high capacitance-voltage (CV) density, very good thermal withstanding, and have been widely used as miniature devices in low stress applications. Unfortunately, in power applications that require large capacitance, high voltage and excellent volumetric efficiencies, ceramic capacitors have not met expectations.

Electrolytic capacitors, as exemplified by the aluminum and tantalum electrolytics, also suffer from a number of performance limitations. The dielectric constants of the aluminum oxide and tantalum oxide dielectrics are about 10 and 28, respectively. Their breakdown voltages are at least an order of magnitude lower than polymers, however, offering little if any net advantage. Their maximum operating voltage is about 400 volts (V). Highest practical energy density achieved has been about 3 J/cc. They suffer from relatively very high leakage, very high dissipation factor (DF), hydrogen and electrolyte outgassing, reforming periodically, high equivalent series resistance (ESR) and form factor. At frequencies above 200 kilohertz (KHz), electrolytic capacitors fail from dielectric instability and poor impedance response.

Electrochemical capacitors are symmetric devices in which the electrolyte is placed between two identical electrode systems. While electrochemical capacitors can store and deliver charge in the time scale of the order of several tens of seconds, their ability to deliver charge at short times is dictated by kinetics of the surface redox (oxidation-reduction) reactions and combined resistivity of the matrix and electrolyte. Electrochemical capacitors fall into two broad categories: (1) double layer capacitors which rely solely on interfacial charge separation across the electrical double layer; and (2) pseudocapacitors which have enhanced charge storage (similar to a battery, but to a lesser extent) derived from faradaic charge transfer in parallel with the double layer. The double layer, created naturally at an electrode/electrolyte interface, has a thickness of about 10 Angstroms (A). For a high area electrode, the capacitance per unit geometric area is amplified by the roughness factor, which could approach 100,000 times. The specific capacitance is further increased in electrode systems having a substantial potential region over which a faradaic reaction (similar to a battery reaction, but to a lesser degree) takes place. Thus electrochemical capacitors, unlike their electrostatic counterparts, can accumulate substantial charge, because of the molecular level charge separation coupled with the high charge density associated with the surface redox processes on high area electrodes.

The projected energy density for electrochemical capacitors is two orders of magnitude lower than that of batteries, but power densities are several orders of magnitude higher. Energy density is much better than for conventional film capacitors but in terms of power, the electrochemical capacitors are more suitable for relatively long discharges (milliseconds (ms) to several seconds) and low to intermediate power applications. Carbon capacitors exhibit high cycle life and good stability, thus making them useful in applications such as lightweight electronic fuses, backup power sources for calculators, and surge-power delivery devices for electric vehicles. Recently, carbon capacitors have been used in small toy cars. Carbon based capacitors utilize very thick electrodes in their construction, resulting in poor particle to particle contact of the agglomerate and high ionic resistance from the electrolyte distributed in the microporous structure. The electrodes are made highly porous allowing for air and sulfuric acid to penetrate deep into the porous structure to achieve the full benefit of the surface area. Although this results in high capacitance and energy density, the ESR increases as a result of the highly porous and thick structure.

Although the pseudocapacitors utilizing valve metal oxide electrodes such as ruthenium or iridium oxide possess very high double layer capacities emanating from the intrinsic high surface areas and redox processes, leading to energy densities as high as 10 to 20 J/cc, they suffer from the same limitations as the carbon capacitors with high ESR. Ruthenium oxide has a high double layer capacity of about 150 microfarads per real square centimeter ($\mu F$/real $cm^2$). Since the intrinsic surface area of this material is very high, it is probable that the intrinsic capacitance will also be extremely high. The superior, demonstrated performance of the $RuO_2$-based capacitor is a consequence of the high exchange current density of the $RuO_2/Ru_2O_3$ reaction, although this advantage is negated by the porous nature of the $RuO_2$ matrix used in such devices. Craig, in Canadian Patent No. 1,196,683 (1985), describes a supercapacitor based on ruthenium oxide and mixtures of ruthenium and tantalum oxides and reported capacitances as high as 2.8 $F/cm^2$. Increase in the ESR of the capacitor is a consequence of the reduction in the exchange current density. This may be overcome if the capacitor is designed with ultra-thin electrodes and highly conductive thin film electrolytes.

Electrochemical capacitors based on $RuO_2$ and solid polymer electrolyte have been studied at Giner, Inc (MA). The use of a solid polymer electrolyte leads to a leak-free system that contains no corrosive liquid electrolyte. This concept was based on the use of a hydrated ionomer membrane such as DuPont's Nafion™. The composite structure ensured a continuous proton-conducting ionomer linkage throughout a single cell, thus facilitating proton transport from one electrode to the other. The performance of this capacitor containing only hydrated water dropped off abruptly below the freezing point of water and in addition, the ESR was fairly high at about 0.3 ohm-cm$^2$. Subsequent use of sulfuric acid improved the proton conductivity within the particulate by accessing pores down to 100 A diameter.

This study was interesting and demonstrated that high proton conductivity and materials based on very high exchange current densities is effectively required for lowering the ESR. However, the problem with using Nafion™ type membranes is that they are fairly thick, resulting in high internal resistance and also very weak polymers. Swelling of the membrane by the sulfuric acid decreases its strength and conductivity even further. A polymer electrolyte that can be mechanically stable and designed in very thin film and highly conducting form would be desirable for reducing the internal resistance.

In order to obtain high energy content per unit weight and volume, it is necessary to utilize electrochemically active materials of significantly higher energy content than in present commercial capacitors. The best possibilities lie in a capacitor that incorporate materials based on high surface area activated carbon or valve metal oxides such as $RuO_2$. Furthermore, in order to access the entire porous structure of $RuO_2$ efficiently and achieve high capacitance (hence, high energy) and high power at low ESR, the electrode needs to be designed in very thin film form. Thinner electrodes are more feasible with pseudocapacitors than with double layer capacitors due to the greater capacitance density of the former.

Experience has shown that higher cyclability, higher power, lower internal resistance and greater capacity utilization is favored by designs that incorporate very thin electrode and electrolyte structures. Ultra-thin electrode and electrolyte will overcome kinetic constraints on the specific power, cycling efficiency and capacity utilization. The thinner the electrode, the shorter is the time needed to access regions of the structure farthest from the macroscopic electrode/electrolyte interface, thus opening up the possibility of constructing the more compact bipolar stacks necessary for high voltage, pulse power applications. In addition, improving the capacity of the electrode is a very important feature for devices that requires very long discharge times such as, for example, in electric vehicles or in cellular telephones.

The energy density of an electrochemical capacitor can further be increased if very thin inactive substrate materials such as metallized plastic current collectors are used. The use of such substrates will also result in low-cost devices. Electrochemical capacitors are lower voltage devices; aqueous based are 1 V/cell and non-aqueous based are about 3 to 4 V/cell. Connection of devices in series to obtain higher voltages results in a decrease in capacitance as well as an increase in ESR, according to the number of units in series. One of the advantages of using liquid organic electrolytes is the theoretical wider electrochemical window. An immediate consequence is an increase of the energy density (Energy=½(CV$^2$), where C is static capacitance) and the power (Power=V$^2$/R) densities.

SUMMARY OF THE INVENTION

Accordingly, it is a principal object of the present invention to provide a base polymer material for a polymer electrolyte that is dimensionally stable in the liquid solvents, aqueous or non-aqueous, presently used in electrochemical capacitors, and that is highly stable with temperature.

Another object of the invention is to provide a base polymer material for a polymer electrolyte that exhibits little or no swelling characteristics when in contact with liquid solvents, compared to prior art membranes.

Another object of the invention is to provide a base polymer material that is predominantly amorphous in nature.

Still another object is to provide a base polymer material for a polymer electrolyte that is mechanically stronger than prior art membranes when in contact with liquid solvents.

Still another object is to provide a polymer electrolyte with high ionic conductivity.

Yet another object of the invention is to provide polymer electrolyte compositions which are more conductive at lower levels of liquid solvents than prior art polymer electrolyte-solvent compositions.

Another object of the invention is to provide polymer electrolyte compositions in ultrathin film form.

Another object of the invention is to provide polymer electrolyte compositions with a wide temperature range of operation.

Yet another object of the invention is to provide polymer electrolyte compositions with ionomer or ionically conductive backbone to further facilitate the conduction process.

A further object of the invention is to provide polymer electrolyte compositions in which the solvent is immobilized in the polymer, to allow electrochemical capacitors constructed from such compositions to be used in any orientation.

Another object of the invention is to provide polymer electrolyte compositions that can be manufactured in very thin film form, provide low resistance and excellent flexibility.

Yet another object of the invention is to provide electrochemical capacitor electrodes that are ultra-thin and conductive.

Still another object of the invention is to provide methods of manufacturing such ultra-thin and conductive electrodes.

Another object of the invention is to provide electrochemical capacitor electrodes with high capacity.

Still another important object of the invention is to provide an electrochemical capacitor with polymer electrolyte compositions and ultra-thin electrodes described in the preceding enumerated objects.

A further object is to provide such electrochemical capacitors with ultra-thin current collectors such as very thin metallic elements or metallized polymer substrates for improved energy density, power density, higher capacity utilization, higher cycle life, greater charge-discharge efficiencies, lower ESR, greater safety, and greater reliability, and which can be produced at high speed, lower cost, and with improved form factors.

Another object of the invention is to coat the thin substrate with very thin active anode and cathode material.

A related object is to laminate the anode and cathode elements on both sides of the metallized polymer substrate material so as to yield a highly flexible electrode.

The electrolyte of the present invention is preferably a proton conductor or is very conductive, is very flexible and somewhat dry, is of low cost, and in some preferred embodiments of the invention is constructed in very thin film format. Polymer electrolytes of this design can be combined with various similar electrode materials such as carbon, materials from the valve metal oxides to provide electrochemical capacitors having high specific energy (Wh/kg) (gravimetric) and energy density (Wh/l) (volumetric), high cycle life, low ESR, low leakage, and which provide improved safety.

One embodiment of a solid base polymer material of a polymer electrolyte of an electrochemical capacitor according to the invention is a thin film polymer selected from a group consisting of polyester (PET), polypropylene (PP), polyethylene napthalate (PEN), polycarbonate (PC), polyphenylene sulfide (PPS), polyvinylidene-fluoride (PVDF), and polytetrafluoroethylene (PTFE), or a combination of two or more thereof. The specific polymer and its concentration in the polymer electrolyte are selected to tailor at least one desired property of the polymer electrolyte. The base polymer material may include a perfluorocarbon-sulfonated ionomer electrolyte such as Nafion™, 2-acrylamido-2-methyl propane sulfonate (or AMPS), or the Dow membrane XUS13204.10 or other ionomer materials based on different blends of fluoropolymers, including poly (chlorotrifluoro-ethylene), poly(ethylene-chlorotrifluoroethylene), poly(fluorinated ethylene-propylene), polytetrafluoroethylene, hexafluoropropene and polyvinylidene-fluoride (PVDF) and mixtures of these ionomers. Such materials have a perfluorocarbon polymer backbone to which sulfonic acid sites are permanently anchored. Or the base polymer material may include an ionically conducting polymer such as an acrylate, polyethylene oxide (PEO), polypropylene oxide (PPO), poly(bis(methoxy-ethoxy-ethoxide))-phosphazene (MEEP), polyacrylonitrile (PAN), polymethylmethacrylate (PMMA), polymethyl-acrylonitrile (PMAN), or other suitable ionically conductive polymer or a combination of ionically conductive polymers, and so forth.

In another embodiment, an electrolyte-retaining base polymer material for an electrochemical capacitor is a polymer thin film cast from a solution of the base polymer such as PVDF and acrylate monomer/oligomer radiation cured after which a solvent in which those constituents were dissolved has substantially evaporated. A liquid or semi-liquid electrolyte solution containing a salt for ionic conduction such as a quaternary phosphonium ($R_4P^+$) salt, or a quarternary ammonium salt ($R_4N^+$), or a metal salt such as sodium, lithium, potassium, magnesium, or calcium salt, more preferably lithium, is absorbed within the thin film. R in this case is an alkyl group while the anion of the salt may be chosen from hexafluorophosphate ($PF_6^-$), perchlorate ($ClO_4^-$), tetrafluoroborate ($BF_4^-$), hexafluoroarsenate ($AsF_6^-$), tetrachloroaluminate ($AlCl_4^-$), trifluoromethane-sulfonate ($CF_3SO_3^-$), methide ($C(SO_2CF_3)_3^-$) and bis (trifluoromethane sulfonyl) imide ($N(CF_3SO_2)_2^-$). In certain embodiments, the salt is a plasticizer salt such as lithium imide or methide.

The liquid electrolyte may be chosen from a wide variety of solvents, including aqueous based sulfuric acid, or a non-aqueous based chosen from ethylene carbonate, propylene carbonate, dimethoxy methane, dimethoxy ethane, tetrahydrofuran, dimethoxy carbonate, diethyl carbonate, acetonitrile, or mixtures of such liquids or any other suitable organic solvents.

In a process of manufacture of this embodiment, the PVDF and acrylate monomer/oligomer are dissolved in a hydrocarbon solvent such as N-Methyl Pyrrolidone (NMP) to form a polymer solution, which is then cast in a thin film, in part by evaporation of the solvent. The film is then soaked in an appropriate liquid electrolyte solution containing an appropriate salt, for absorption of the electrolyte within the film, and the acrylate monomer/oligomer is cured by subjection to electron beam or ultraviolet radiation.

A dimensionally stable, highly resilient embodiment of a polymer solid-solution blend film for an electrochemical capacitor, the film being capable of electrolyte retention without appreciable swelling, is produced by a method in which PVDF and AMPS are mixed homogeneously to form a polymer blend thereof. A very high surface area inorganic filler—either fumed silica or alumina—having an average particle size<0.05 micron ($\mu$m) in diameter and a surface area of at least about 100 $m^2/g$ is then dispersed with a concentration in a range from about 0.1% to about 30% by weight into the copolymer blend to enhance the porosity and mechanical stability of the thin film into which the copolymer blend with inorganic filler is cast. Finally, the resultant film is soaked in a liquid solvent electrolyte for absorption and retention in the film. Preferably, the film is soaked in an aqueous based solvent such as sulfuric acid or a liquid organic electrolyte solvent, each of the solvent containing a salt for ionic conduction. The liquid electrolyte is immobilized in the AMPS/PVDF polymer to allow molecules of the liquid polymer (AMPS) to trap molecules of the electrolyte into pores of the film. Preferably, the liquid polymer is cross-linkable based on AMPS, or other suitable materials such as acrylates and PEO-based materials, and radiation curing is performed to cross-link the liquid polymer for trapping of molecules. Alternatively, some immobilization of the liquid organic solvent electrolyte may be achieved by using a non-ionizable liquid polymer. Dispersion of the inorganic filler into the polymer blend is performed during blending of the PVDF and AMPS.

Also provided by the present invention is an anode and cathode consisting of a first group material(s) possessing properties of high exchange current density, intrinsically high surface area, and high charge capacity in combination with a second group material(s) that essentially has an exceptionally high redox capacity. The first group of materials comprise activated carbon or valve metal oxides. Such materials consist of oxides of titanium, zirconium, hafnium, niobium, tantalum, molybdenum, tungsten, ruthenium, iridium, platinum, palladium, osmium, gold, and rhenium. The second group of materials are selected from a wide range of oxides, sulfides and selenides, or any other group well known in the prior art that are used in lithium batteries, e.g. $MnO_2$, $LiMn_2O_4$, $Li_xMnO_2$, $MoS_2$, $MoS_3$, $MoV_2O_8$, $CoO_2$, $Li_xCoO_2$, $V_6O_{13}$, $V_2O_5$, $V_3O_8$, $VO_2$, $V_2S_5$, $TiS_2$, $NbSe_3$, $Cr_2O_5$, $Cr_3O_8$, $WO_3$, $Li_xNiO_2$, $Li_xNi_yCo_zO_2$, $Li_xNi_yMn_zO_2$, $Li_xCo_yMn_zO_2$, lithium doped electronically conducting polymers such as polypyrrole, polyaniline, polyacetylene, and so forth. The first group of materials may be single oxides or multiple oxides. The second group of materials may consist of one compound or a mixture of compounds. The composition of the first group materials is 1 to 99% while the balance is from the second group of materials.

A method of producing an embodiment of the invention includes physically mixing the activated carbon or valve metal oxide or oxides with the battery active material to enhance the discharge time of the capacitor.

A method of producing another embodiment of the invention includes blending electrode active materials with polymer electrolytes of the above compositions.

A method of producing yet another embodiment of the invention is to fabricate ultra-thin thin film electrodes of these material in a thickness in a range from 1 $\mu$m to more than 100 $\mu$m.

Any of these polymer electrolyte films and electrodes may be used to form an electrochemical cell, particularly an electrochemical capacitor, by tightly sandwiching the film between thin, flexible active anode and active cathode layers.

For example, one embodiment of a thin film electrochemical capacitor is formed from a resilient flexible polymeric electrolyte thin film that includes a base polymer with inorganic filler dispersed therein to increase surface area and porosity of the film, impregnated with a semi-liquid or even dry solution of liquid polymer, organic solvent electrolyte and a salt; and a pair of spaced-apart flexible thin film electrodes, each including a polymer substrate having an adherent electrically conductive layer of the above mentioned metallic material thereon, the polymer electrolyte film being tightly sandwiched between the pair of thin film electrodes. The polymer substrate of each of the anode and cathode is preferably selected from a group of polymers including PET, PP, PPS, PEN, PVDF and PE, and each polymer substrate is metallized to form the conductive layer thereon. The ultra thin film metallized polymer substrate has a thickness in a range from about 0.5 micron to about 50 microns, thereby rendering it very flexible for ease of coating and handling, to avoid kinking and deformation thereof, during manufacture of electrochemical capacitors.

The electrochemical capacitor polymer substrate may comprise a layer of polymer material, and a low resistance metallization layer having a conductivity in a range from about 0.01 ohm per square to about 1 ohm per square overlying and adhered to a side of the polymer material. Preferably, the layer of polymer material has a non-metallized margin with a width in the range from about one mm to about three mm. Preferably, also, a low resistance metallization layer having a conductivity in the aforementioned range overlies and is adhered to each side of the polymer material, and both sides of the layer of polymer material have such a non-metallized margin present at the same edge of the layer of polymer material.

According to another aspect of the invention, an electrochemical capacitor electrode comprises an ultra thin film metal substrate for at least one of a cathode substrate and an anode substrate of an electrochemical capacitor, the ultra thin film metal substrate having a thickness in a range from about one micron to about 10 microns and may comprise one of the following metallic materials chosen from aluminum, copper, nickel, titanium, stainless steel, or an alloy such as inconel or any other suitable stable metallic material.

According to another aspect of the invention, the selected metal or alloy is etched either physically or chemically to increase the substrate intrinsic surface area.

According to yet another aspect of the invention, a method of fabricating a thin film electrochemical capacitor includes incorporating an ultra thin film metallized polymer substrate in the capacitor during fabrication thereof, wherein the polymer layer in the substrate has a thickness in a range from about 0.5 micron to about 50 microns, in conjunction with very thin film capacitor electrode/electrolyte structures having thickness less than 5 microns, respectively, wherein the thickness of the metallization layer on the polymer layer is selected according to desired conductivity thereof The invention also provides novel methods of coating an ultra thin film metallized polymer substrate for a thin film electrochemical capacitor with very thin film active anode material and active cathode material. One method comprises steps of milling each of the anode material and the cathode material in a separate solvent to reduce the particle size of the respective material, injecting respective ones of the materials directly onto the substrate at opposite sides thereof, and subsequently drawing each of the materials at opposite sides of the substrate into a thin film of desired thickness using wire wound rods or Mayer rods of different wire diameters to control wet slurry thickness. The substrate is coated on one side of the metallized polymer substrate, rather than both sides. Coating an anode on one side and a cathode on the other side would only apply to a bipolar electrode.

Another coating method includes incorporating each of the materials into its own aerosol mix, spraying atomized aerosol of each material directly on respective opposite sides of the film substrate while moving said substrate past the points of aerosol spray at high speed, and curing the sprayed material either by drying or radiation. Yet another coating method comprises evaporating the respective electrode material directly onto respective opposite sides of the substrate.

Also according to the invention, a method of fabricating a thin film electrochemical capacitor involves laminating anode and cathode elements on respective opposite sides of a double-metallized polymer substrate, whereby to yield a highly flexible electrode structure for the capacitor. Non-metallized margins are provided on each of the anode and cathode elements on the opposite sides of the metallized polymer substrate, and metal is sprayed on opposite ends of the laminated metallized polymer substrate for terminations thereto. These techniques enable the provision of a ratio of substrate thickness to active electrode thickness less than about 0.5.

Also according to the invention, a method of fabricating a thin film bipolar element is provided involving laminating anode and cathode active elements on respective opposite sides of a double-metallized of the same polymer substrate which has been impregnated with an electronically conductive material within the polymer substrate such as carbon black or metallic elements (inert to the active electrode), whereby to yield a highly flexible and strong electrode structure for the capacitor.

Also according to the invention, a method of fabricating a thin film bipolar element is provided as described immediately above, but the double-metallized and conductive polymer substrate is replaced by a very thin film metallic substrate.

Also, according to the invention is provided, a method of forming a bipolar element is provided also as described above, but with a coating of polymer electrolyte on each side of the bipolar electrode.

BRIEF DESCRIPTION OF THE DRAWINGS

The above and still further aims, objectives, features, aspects and attendant advantages of the present invention will become apparent from the following detailed description of certain preferred embodiments and methods of fabrication of a thin film electrochemical capacitor in accordance with the invention, constituting the best mode presently contemplated of practicing the invention, when taken in conjunction with the accompanying drawings, in which:

FIGS. 1A, 1B and 1C are sectional side views of different polymer substrate electrode structures for a thin film electrochemical capacitor, in which FIG. 1A illustrates a structure of a metallized plain polymer film with an unmetallized margin having a coating of active cathode material not on the margin; FIG. 1B illustrates a structure of a metallized plain polymer film with an unmetallized margin, but having layers of active anode material and polymer electrolyte not on the margin; and FIG. 1C illustrates a dual electrode structure in which an electrode element is laminated on respective opposite sides of a double-metallized polymer substrate;

DESCRIPTION OF THE PREFERRED EMBODIMENTS AND METHODS

Figure 1A:
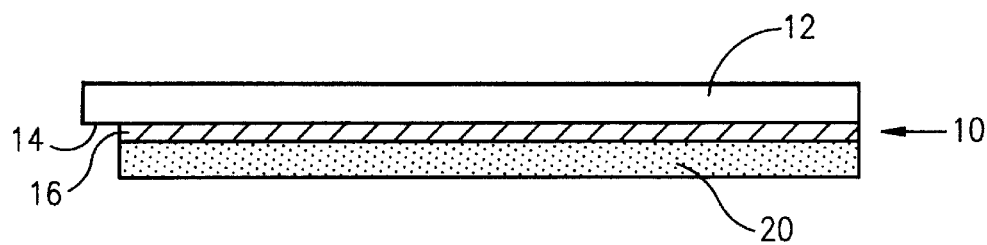

According to a first aspect of the present invention, a range of base polymer compositions is provided for the membrane of the electrochemical cell with improved chemical stability in liquid solvent electrolytes and improved chemical stability as a function of temperature. Polymer materials with high breakdown voltages or strengths and low dissipation factors, such as those employed in film capacitors, have been found to be chemically more stable than other materials with liquid organic or aqueous solvents.

A preferred base polymer material for making a room temperature highly conductive polymer electrolyte contains one selected from a group having pronounced ionic conductivity, and the other selected from a second group consisting of polymers which are non-ionically conductive. The second polymer serves to provide the basic backbone or strength of the final polymer electrolyte when manufactured in ultra-thin films. However, if the polymer material selected from the first group provides sufficient strength to the polymer electrolyte, a polymer from the second group need not be included in the composition of the base polymer material. Likewise, if a polymer selected from the second group, in addition to meeting the requisite film strength requirement also provides the desired ionic conductivity to the polymer electrolyte, a different polymer from the first group need not be included in the base polymer.

The first group of polymers for a base polymer material are tonically conductive polymers mixed with a metal salt, preferably a lithium or a quarternary alkyl ammonium or quarternary alkyl phosphonium salt. Preferably the ionically conductive polymer has a hetero atom with a lone pair of electrons available for the metal ions of the metal salt to attach to and move between during conduction in the final composite, or is an ionomer containing perfluorocarbon backbone with sulfonated chains. It is preferred that the polymer is chosen from a wide range of solid polymeric materials, including those based on linear polymers such a poly(ethylene oxide) or PEO; random copolymers such as oxymethylene linked PEO; block copolymers such as PEO-PPO-PEO crosslinked with trifunctional urethane; comb-branched block copolymers such as poly(bis(methoxy-ethoxy-ethoxide))-phosphazene or MEEP; network structures such as triol-type PEO crosslinked with difunctional urethane; single ion conductors such as poly((oligo) oxyethylene)methacrylate-co-alkali metal methacrylate, polyacrylonitrile (PAN), polymethylmethacrylate (PMA); polymethylacrylonitrile (PMAN); polysiloxanes and their copolymers and derivatives; polyvinylidene fluoride or chloride and copolymers of their derivatives; perfluorocarbon-sulfonated ionomer materials such as Nafion™, 2-acrylamido-2-methyl propane sulfonate (or AMPS), or the Dow membrane XUS13204.10 or other ionomer materials based on different blends of fluoropolymers, including poly (chlorotrifluoro-ethylene, poly(ethylene-chlorotrifluoroethylene), poly(fluorinated ethylene-propylene), polytetrafluoroethylene, hexafluoropropene, and mixtures of the these ionomers; polymers based on a wide variety of acrylates available in the industry; or any other polymers or combination of the above polymers either condensed or cross-linked to form a different polymer or mixed physically, which are combinable with a metal salt, such as a lithium, ammonium or phosphonium salt, to enhance the polymer's ionic conductivity. Even a modestly conductive polymer such as PEO works very well in the electrolyte composition of the present invention, and polymers such as acrylates or MEEP, which possess higher ionic conductivities with a lithium salt should perform at least as well as PEO in the electrolyte compositions of the present invention.

A suitable base polymer material is complexed with a conductive salt solution. Salts which may be combined with the base polymer material include suitable salts of sodium, lithium potassium, calcium, magnesium, ammonium, phosphonium. Preferably a plasticizer salt of a metal, e.g. lithium bis(trifluoromethane sulfonyl)imide(LiN(CF$_3$SO$_2$)$_2$ or lithium imide), lithium methide (LiC(SO$_2$CF$_3$)$_3$), lithium hexafluorophosphate (LiPF$_6$), lithium perchlorate (LiClO$_4$), lithium tetrafluoroborate (LiBF$_4$), lithium hexafluoroarsenate (LiAsF$_6$), lithium tetrachloroaluminate (LiAlCl$_4$), and lithium trifluoromethanesulfonate (LiCF$_3$SO$_3$) is used. Another preferable salt is a quarternary alkyl ammonium or quarternary alkyl phosphonium salt of the above lithium salt anions.

The liquid electrolyte solution may be chosen from a wide variety of solvents, including aqueous based sulfuric acid, or non-aqueous based organic liquids chosen from among ethylene carbonate, propylene carbonate, dimethoxy methane, dimethoxy ethane, tetrahydrofuran, dimethyl carbonate, diethyl carbonate, acetonitrile, or mixtures of such liquids or any other suitable organic solvents.

A particular salt solution is chosen such that, when added to a polymer such as MEEP, the base polymer/salt mixture yields a conductivity of at least about $5\times10^{-2}$ S/cm at 25° C. On the other hand, a particular salt solution such as one molar tetraalkyl ammonium borate in aqueous sulfuric acid when added to AMPS polymer and cured yields a conductivity of at least 1 S/cm at 25° C. Polymers based on various acrylate compositions and lithium imide also yield good conductivity values. A particular liquid solvent or solvents are chosen to provide chemical stability, excellent ionic conductivity when combined with a particular salt, and thermal stability. Organic liquids based on 50:50 ethylene carbonate and propylene carbonate and 1M lithium imide yield conductivities as high as $3\times10^{-2}$ S/cm while liquids based on acetonitrile can be used at significantly lower temperatures down to –40° C.

The second group of polymers for use in a base polymer material or composition includes more inert and high strength materials such as polyester (PET), polypropylene (PP), polyethylene napthlate (PEN), polyvinylidene fluoride (PVDF), polycarbonate (PC), polyphenylene sulfide (PPS) and polytetrafluoroethylene (PTFE). Other polymer materials that possess similar characteristics to these polymers could also be used.

In a two-polymer blend, the concentration of one the polymers from either the first or second group is in the range from 1% to 99% by weight, the remainder of the blend being the other polymer. The specific polymers chosen from these two groups, and their concentrations in the blend, are selected so as to tailor at least one desired property of the base polymer material. In any case, the chosen polymers provide a base polymer material with high temperature stability, up to at least 100° C. Most of the materials described above, including PVDF, acrylates, PEO, PPO, and the like, possess such thermodynamic or high temperature stability.

In a process of manufacture of this embodiment, the PVDF and acrylate monomer/oligomer are dissolved in a hydrocarbon solvent such as N-Methyl Pyrrolidone (NM) to form a polymer solution, which is then cast in a thin film, in part by evaporation of the solvent. The film is then soaked in an appropriate liquid electrolyte solution containing an appropriate salt, for absorption of the electrolyte within the film, and the acrylate monomer/oligomer is cured by subjection to electron beam or ultraviolet radiation. The addition of immobilized liquid salt solution in an ionic conductor in very thin film polymer electrolytes allows the use of lesser quantity of liquid solvents.

The applicant has found that by dispersing about 0.1 to 30% (by volume of the final electrolyte composition) fumed silica or very high surface area alumina filler into a base polymer/salt intermediate composition, the ionic conductivity of the resulting mixture increases by about one-half to one order of magnitude above that of the polymer/salt complex alone. It was also observed that the electrolyte film is dimensionally stable when in contact with liquid solvent electrolytes and will not swell to any appreciable extent. One source for a suitable high surface area alumina preparation is Degussa Corporation.

Preferably, the inorganic filler is fumed silica, a high pure silica in an amorphous crystalline structure, which has a fine particle size and a very high specific surface area similar to alumina. The fine particle size is highly preferred not only to maintain the high specific surface area but also to make the polymer electrolyte contain the silica homogeneously dispersed. A desirable mean particle size is 0.05 micron or less, preferably 0.01 micron or less. The surface area is 100 $m^2/g$ or more, preferably 200 $m^2/g$. Examples of some suitable fine particle silicas are: AEROSIL 380™, available from Nippon Aerosil; CAB-O-SIL™ GARDE EH-5™ from Cabot Corporation; and SNOWTEX-O™ (a dispersion of silica in water or alcohol) available from Nissan Chemical Industries Ltd. The base polymer material with an appropriate salt solution and inorganic filler may be cast using a thin film coating process. Alternatively, dispersion of the inorganic filler into the polymer blend may also be accomplished during polymer and salt dissolution into a solvent. For some uses, the preferred filler content is 0.1–30% fumed silica or alumina having an average particle size less than or equal to 0.01 micron. In the most desirable compositions, the filler enhances the ionic conductivity of the polymer materials by at least one order of magnitude.

Another embodiment of the invention resides in forming hybrid base polymer blends in which the film is mechanically stronger than traditional ionomers and the final polymer electrolyte is stronger when in contact with liquid electrolyte. Representative examples indicate that polymers prepared with PVDF and Nafion™ or AMPS in varying ratios with high surface area silica or alumina inorganic filler, have greater mechanical strength than Nafion™ or AMPS alone.

Cross-linking a cross-linkable liquid polymer using either ultraviolet (UV) or electron beam (EB) radiation is the most preferred method of immobilizing the liquid organic solvent electrolyte into the base polymer structure, although a non-ionizable liquid polymer may also reduce the mobility of the solvent from the polymer. Representative examples of cross-linkable polymers include those polymers based on acrylates and PEO-based materials; AMPS, and those based on non-cross-linkable polymers include MEEP, polyacrylonitrile, and so forth. Cross-linking is most preferred because the liquid polymer molecule traps the solvent molecule during radiation curing into the pores of the base polymer. The applicant herein has found that no restriction exists on the type of liquid polymer material used. However, it is preferable to use a polymer having a hetero atom with a lone pair of electrons for the cations of the salt to latch onto and move during the conduction process from one lone pair site to another. In the case of ionomers, it is preferable if sulfonic groups exist in which case it will be either protons or lithium ions which will move from one sulfonic group to another.

Preferable polymers include MEEP which demonstrates excellent ionic conductivities at room temperature ($10^{-5}$ S/cm), or more preferably acrylates which have excellent solvent retention properties and can be cured in-situ trapping the solvents within the polymer.

The base hybrid polymer thus formed is no longer crystalline, but predominantly amorphous in nature.

The applicant herein has further found that the use of plasticizer salts such as lithium imide with ionomeric polymers containing acetonitrile as the liquid organic solvents in base polymers containing PVDF and 20% high surface area alumina yield conductivity values at least 2 orders of magnitude higher than those polymer electrolytes containing conventional lithium salts and allow lower temperature performance.

It will be appreciated that the present invention allows fabrication of very thin, low resistance, flexible films of this polymer electrolyte, without loss of mechanical integrity, conductivity, and mechanical strength. By virtue of introducing the above-described preferred methods, which produce excellent mechanical strength and porosity of the base polymer via the copolymer hybrid design and addition of high surface area alumina or silica, reduce the swelling properties of the polymer with liquid solvents, reduce the level of liquid solvents into the polymer, improve the ionic conductivity of the polymer electrolyte by introducing plasticizer salts and ionically conductive polymers into the base polymer, and immobilizing the solvents, gelled polymer electrolytes as thin as 5–10 microns or less can be manufactured simply by selective use of the various components of the polymer electrolyte. Such polymer electrolytes are not only thin, but truly flexible; and the thinness of the structure allows the possibility of lower resistances than are available from liquid electrolytes absorbed in traditional glass-matt separators used in present electrochemical capacitors. Traditional separator materials are usually at least 25 microns thick. The design of gelled polymer electrolytes according to the present invention suggests that the effective resistance for thinner polymer electrolyte sections should be at least half that observed in liquid electrolytes alone.

According to yet another embodiment of the present invention, an electrochemical cell is provided having improved performance, in which the cell has a polymer electrolyte layer fabricated as one of the above-described embodiments, and an anode and cathode consisting of similar materials (termed electrode for simplicity). Each of the anode and the cathode is selected from a group of materials that provides a very high capacity. The composition of the electrode comprise of two groups of materials. The first group provide intrinsically high surface area for large double layer capacity, rapid kinetic charge transfer of the ions for high rate discharge and/or redox capacity or pseudo-capacitance. The second group provide additionally larger redox capacity but relatively slower charge transfer.

The first group of materials comprise activated carbon or a metal oxide or a mixture of at least two metal oxides selected from the group of metal oxides consisting of oxides of valve metals, noble metals, alloys of valve metals, alloys of noble metals, and mixtures of valve and noble metals. Such materials consist of oxides of titanium, zirconium, haftium, niobium, tantalum, molybdenum, tungsten, ruthenium, iridium, platinum, palladium, osmium, gold, and rhenium. Surface area enhancement of these oxides occurs by virtue of the preferred molecular fit which is possible using mixed-sized metal oxide molecules in lattice arrangements. Thus, whereas a single metal oxide produces a mono-lattice with routine gaps where molecules abut one another, a mixed metal oxide with differently sized molecules produces a binary lattice where the gaps of the mono-lattice may have gaps between the contact points of the two molecules making it up. If a third differently sized metal oxide is added, further gap-filling is possible. Such arrangements provide a means for substantially enhancing the surface area of the underlying electrode.

The metal oxides of the first group consist of oxides of valve and/or platinum group metals capable of reversible oxidation and reduction. In certain preferred electrodes, the mixture comprises a mixture of ruthenium oxide, iridium oxide, and tantalum oxide. The composition of the different mixture depends upon the desired final property and can have a wide range of variable composition.

An unexpected finding occurred in use of the electrodes of the invention. It was found that the addition of a second group of materials, primarily those based on battery active materials, and more specifically those based on lithium battery materials, not only increases the capacity of the electrode, but allows the electrode to discharge over a prolong period of time. The active second group material is selected from the group consisting of $MnO_2$, $LiMn_2O_4$, $Li_xMnO_2$, $MoS_2$, $MoS_3$, $MoV_2O_8$, $CoO_2$, $Li_xCoO_2$, $V_6O_{13}$, $V_2O_5$, $V_3O_8$, $VO_2$, $V_2S_5$, $TiS_2$, $NbSe_3$, $Cr_2O_5$, $Cr_3O_8$, $WO_3$, $Li_xNiO_2$, $Li_xNi_yCo_zO_2$, $Li_xNi_yMn_zO_2$, $Li_xCo_yMn_zO_2$, or mixtures thereof. In some alternative embodiments the material may employ an electronically conducting polymer, which may be polypyrrole, polyaniline or polyacetylene, for example.

By way of example, the applicant has found that combining $RuO_2$:$IrO_2$:$TaO_2$:$MnO_2$ in the ratio 1:1:1:1, enables attainment of an electrode with at least 50% greater discharge capacity and time than if $RuO_2$:$IrO_2$:$TaO_2$ is used in the ratio 1:1:1. The fast discharge time associated with the valve metal oxides is not compromised as a result of adding manganese dioxide. In fact, it will be seen below that the design of electrode allows the use of the slowest kinetic battery material in such combination. Of course, the invention is not restricted to this composition or material but can be extended to a wide range of compositions and to different combinations of materials.

Electrochemical capacitor electrodes are traditionally made by calendaring the electrode paste onto a nickel or stainless steel gauze and compacting between heated rollers. The substrate material is typically about 2 to 3 mils thick while the active electrodes are typically about 5 to 10 mils thick, with a microporous glass mat separator sandwiched between them, and wound in a jelly-roll manner. Thick inactive substrates used in such cell construction effectively reduce the energy density of the capacitor.

In yet another of its aspects, the present invention incorporates ultra thin film metal substrates in thin film electrochemical capacitors, in preferred thickness less than 5 microns and more preferably less than 2 microns. At present, minimum thickness available for some metallic elements, such as copper or aluminum foil, is about 5 microns. By contrast, conventional metal foils used for this purpose are typically thicker. Typical metallic material is aluminum. However, copper, nickel, titanium, inconel, stainless steel, zinc, gold, valve metals, or any compatible metallic elements or alloys with the overlying active electrode material will suffice. Preferably, when using valve metal oxides as the electrode material, the substrate is surface-enhanced and etched titanium foil. The most preferred thin designs of the new polymer electrolytes of the present invention are preferably used together with very thin electrode elements to provide thinner electrode/electrolyte structures (e.g., <<5 microns/<<5 microns) with very large surface areas and very thin inactive current collectors. These electrode/electrolyte combinations can be fabricated at low cost. A thin layer of active electrode material about 1 to 100 microns thick is applied or adhered to the ultra thin metal substrate, as described below.

Alternatively, the electrode/electrolyte structures may use metallized plastic or polymer substrate current collectors up to about 10 microns thick, preferably 1–10 $\mu$m, instead of the above-described very thin metallic element. The polymer substrate of each of the anode and cathode is preferably selected from a group of polymers including polyester (PET), polypropylene (PP), polyethylene napthlate (PEN), polyethylene (PE), polyvinylidene fluoride (PVDF), polycarbonate (PC), polyphenylene sulfide (PPS) and polytetrafluoroethylene (PTFE). Other polymer materials that possess similar characteristics to these polymers could also be used and each polymer substrate is metallized to form the conductive layer thereon.

Figure 1B:
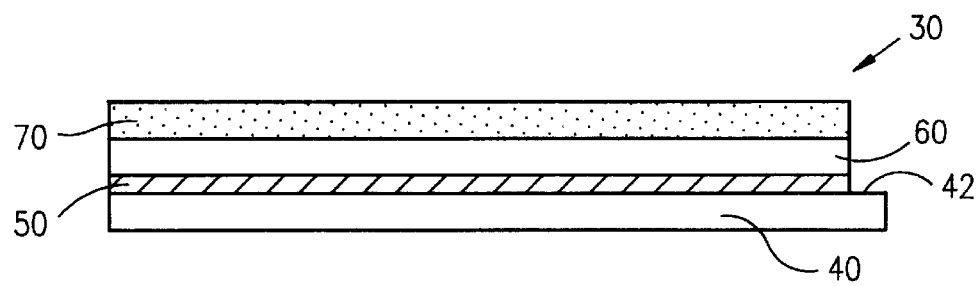

FIGS. 1A and 1B illustrate ultra-thin electrode structures employing a plain polymer substrate with a metal layer (sometimes referred to herein as metallization layer) and an unmetallized margin. In FIG. 1A, an anode 10 includes a plain polymer film substrate 12, e.g., polyester, with an overlying metal layer 16 not entirely covering the substrate, to leave an unmetallized margin 14 of uncoated polyester. A thin coating of active anode material 20 is applied atop metal layer 16. In FIG. 1B, cathode 30 includes a plain polymer film substrate 40 which may be identical to substrate 12 of the anode structure of FIG. 1A. Similarly, the polymer substrate 40 is metallized with a layer 50, except for an unmetallized margin 42. A layer of active cathode material 60 is deposited or otherwise applied over metallization layer 50. As with the anode material 20 of the anode 10 of FIG. 1A, cathode material 60 does not extend onto the unmetallized margin. A thin layer of polymer electrolyte 70 is then applied atop the cathode material 60, and like the latter, does not extend into the margin 42.

Alternatively, the polymer substrate of the electrode structure may be impregnated with an electronically conductive element that is inert to the active electrode, and then metallized on both sides of the substrate without a margin, as will be discussed in greater detail below in conjunction with a description of FIG. 3. Such an electronically conductive element may comprise conductive carbon, or an electronically conductive polymer such as polypyrrole, polyacetylene, or polyanilene, or other such material, or may be a finely ground and dispersed metal which is impregnated into the polymer substrate. The conductivity of such an impregnated polymer substrate should be greater than $10^2$ S/cm. These impregnated polymer substrates are particularly suitable for electrode structures where the active electrode material is coated on both sides of the metallized plastic current collector, or where bipolar half-elements are constructed.

Typically, the metallization material for the electrode structure is aluminum, but metals such as copper, nickel, titanium, inconel, stainless steel, zinc, gold, carbon, or any other metallization material which is compatible with the overlying active electrode material is satisfactory. The selected thickness of the metallization layer depends upon the particular conductivity requirement and the desired resistivity of the metal. Preferably, when using valve metal oxides as the electrode material, the metallization material is titanium. The polymer substrate layer may range in thickness, for example, from 0.5 micron to greater than 50 microns. Hence, the substrate is very flexible for ease of coating and handling, able to avoid kinking and deformation thereof during manufacture of the electrochemical capacitors, and facilitates the production of a flexible electrode.

In an exemplary embodiment of an electrochemical capacitor, the active electrode material, such as $RuO_2$, is coated on a titanium metallized polymer. Each polymer substrate electrode material has different, easily identifiable, characteristics and thermal and mechanical properties, and each behaves differently depending upon its use. A suitable material is readily selected according to the desired properties. Ideally, the metal coating should be as thin as possible, while concurrently having very high conductivity. The coating thickness may have a conductivity of less than about 1.0 ohm per square, preferably less than 0.1 ohm per square, and more preferably about 0.01 ohm per square. This ensures low resistance loss during current drain from the metallized substrate.

The metallization may be present on only one side of the polymer layer or substrate, but is preferably provided on both sides thereof Further, the metallization preferably is accomplished to leave an unmetallized (non-metallized) margin having a width in a range from about one millimeter (mm) to about three mm. Where the metallization is present at both sides of the polymer substrate, the non-metallization margin is provided at opposite sides of the polymer material, but on the same edge. When coated with the active material, the coating material is applied to the metallized portion and not the margin. The use of such substrates eliminates the use of additional carrier grids for the electrodes and instead, the metallized plastic current collector can serve the purpose of both the carrier grid for the electrodes and the battery enclosure—which provides a major cost benefit and reduces the inactive component and makes it lightweight, and further increases the energy density of the capacitor.

The thin metal or metallized polymer substrate which as been described herein is coated with very thin film active electrode material to complete an electrode structure that is thinner than known electrodes for thin polymer electrolyte electrochemical devices. Conventional calendaring of the anode and cathode will not lead to the desired thickness. Instead, the active electrode material is milled extensively in a solvent to reduce the particle size, and then injected directly onto the substrate and subsequently drawn into thin films of any of a variety of predetermined thicknesses. Preferably the finely divided electrode material is blended with the polymer electrolyte solution which is radiation curable. Furthermore, polymer electrolytes according to the present invention may also be manufactured using the same process.

A number of different methods may be employed to cast or coat the active electrode material/polymer electrolyte composite from a solvent-based system. Some suitable methods include knife coaters, doctor blade coaters, screen-printing, wire-wound bar coaters or Mayer rods, air knife (or air doctor) coaters, squeeze roll or kiss coaters, gravure coaters, reverse roll coaters, cast film coaters, and transfer roll coaters. One coating system may be preferred over another to achieve a particular intended final result. For instance, coaters that apply an excess to the substrate web and remove the surplus coating, leaving a desired amount on the surface of the web are usually knife coaters, doctor blade coaters, bar or rod coaters, air knife coaters, and squeeze roll coaters. Coaters that apply a predetermined amount of coating to the web include reverse roll coaters, gravure coaters, and transfer roll coaters. Any of these methods may be suitable for coating dry polymer electrolyte film thickness in the range of about 2 to 100 microns.

One preferred technique for applying an electrode/polymer electrolyte composite material is to inject the electrode slurry with the finely dispersed inorganic and organic constituents directly onto the substrate, and then draw it out into a thin film of the desired thickness using wire wound rods (Mayer rods) with different wire diameters. The different diameters of wire control the wet slurry thickness. This method, and the other electrode deposition techniques described herein have not been used previously in the electrochemical capacitor industry to manufacture electrodes. These methods greatly facilitate obtaining an electrode material/polymer electrolyte composite film that is extremely uniform, pin-hole free, flexible and ultra-thin. Film thickness of 2 microns to more than 100 microns can be controlled using this process.

An alternative coating method includes incorporating each of the active electrode composites mixtures into its own aerosol mix and spraying an atomized aerosol of each material directly onto the respective opposite sides of the film substrate. This can be done rapidly while moving the substrate past the points of aerosol spray at high speed. The sprayed active electrolyte materials are cured by drying, or by radiation if the material contains radiation curable polymeric materials. Another alternative method of coating the substrate with active electrode material is to evaporate the respective electrode materials directly onto respective opposite sides of the substrate. In this case, it is preferred that the polymer electrolyte blend include a liquid radiation curable polymer capable of dissolving the metal salt and dispersing the inorganic materials. In such a case, liquid electrolyte solvents are more suitable for use in dispersing the inorganic materials. Polymer electrolytes and active electrode/polymer electrolyte composites manufactured in this manner can result in final film thickness of less than 1 micron and more preferably in thickness of about 0.2 micron or less.

One advantage of these thinner electrode structures is that they undergo significantly less expansion and contraction during discharge and charge than is typical with other electrode structures in an electrochemical capacitor with substantial redox reactions. The polymeric structures within the capacitor (i.e., the metallized film substrates, and polymer film electrolyte) should also accommodate these phenomena. Since the composite cathode and anode structures must be as thin and smooth as possible and have a very high surface area, it is desirable to perform extensive, high speed, wet attrition milling of the electrode formulation. Final particle size of the composite electrodes is less than 0.1 micron, and preferably less than 0.05 micron. This will ensure a very thin film and smooth electrode during the coating process.

Figure 2:
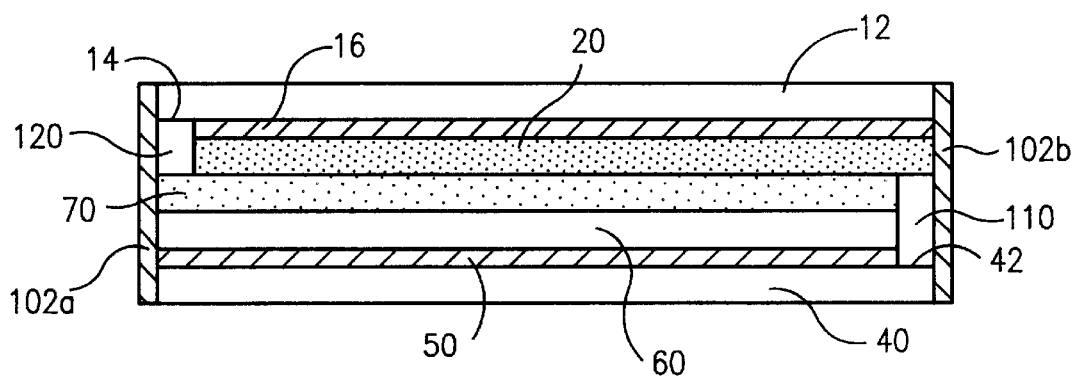
FIG. 2 is a sectional side view of a composite electrochemical capacitor.

FIG. 2 illustrates a completed electrochemical capacitor using the electrode structures of FIGS. 1A and 1B. Metal layers 102a and 102b are applied as terminations to opposite ends of the composite structure in which the anode 10 with substrate 12, metallization layer 16 and anode layer 20 is disposed atop the cathode 30, with anode layer 20 directly overlying the polymer electrolyte layer 70. The arrangement is such that the non-metallized margins 14 and 42 are positioned at opposite ends of the composite structure, so that when the metal termination layers 102a and 102b are applied, they reside in direct electrical contact with the respective metallization/active electrode layers 50/60 and 16/20.

Figure 1C:
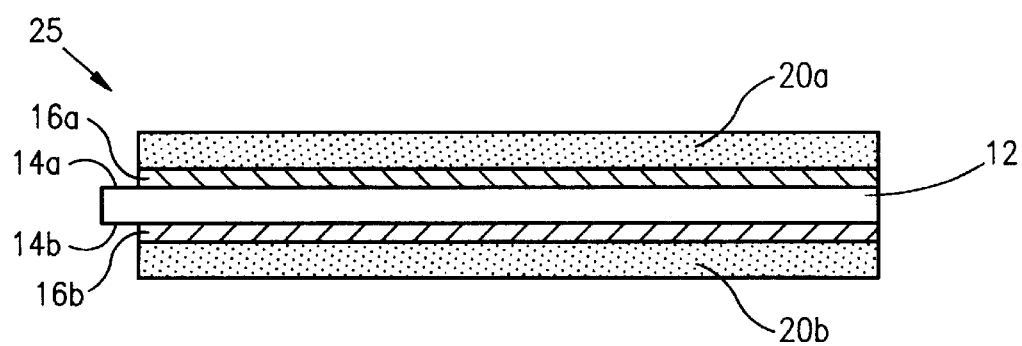

As an alternative to the polymer substrate electrode structures of FIGS. 1A and 1B, a dual electrode structure 25 for a thin film electrochemical capacitor is fabricated by laminating an electrode element on respective opposite sides of a double-metallized polymer substrate 13 to yield a highly flexible and strong electrode structure for the capacitor, as illustrated in FIG. 1C. The double-metallized structure 25 comprises polymer substrate 12 and metallization layers 16a and 16b on opposite sides (major surfaces) thereof with electrode elements 20a and 20b laminated (or otherwise applied) thereon, which leave non-metallized margins 14a, 14b provided on opposite sides of the polymer substrate. In a completed composite electrochemical capacitor structure using the dual electrode structures, the metal terminations are applied at opposite ends of the composite structure, similar to the manner of termination shown in FIG. 2. Employing double-metallized substrates instead of singly-metallized electrode substrates further increases the active components of the capacitor and hence the energy density. It will be readily understood that for metallic anode or cathode elements, the surface resistivity will be significantly lower.

After the anode and cathode composite materials have been coated or laminated onto either an ultra-thin metallic or a metallized plastic current collector, as described above, the anode and cathode elements are coated directly by a thin film polymer electrolyte.

Figure 3:
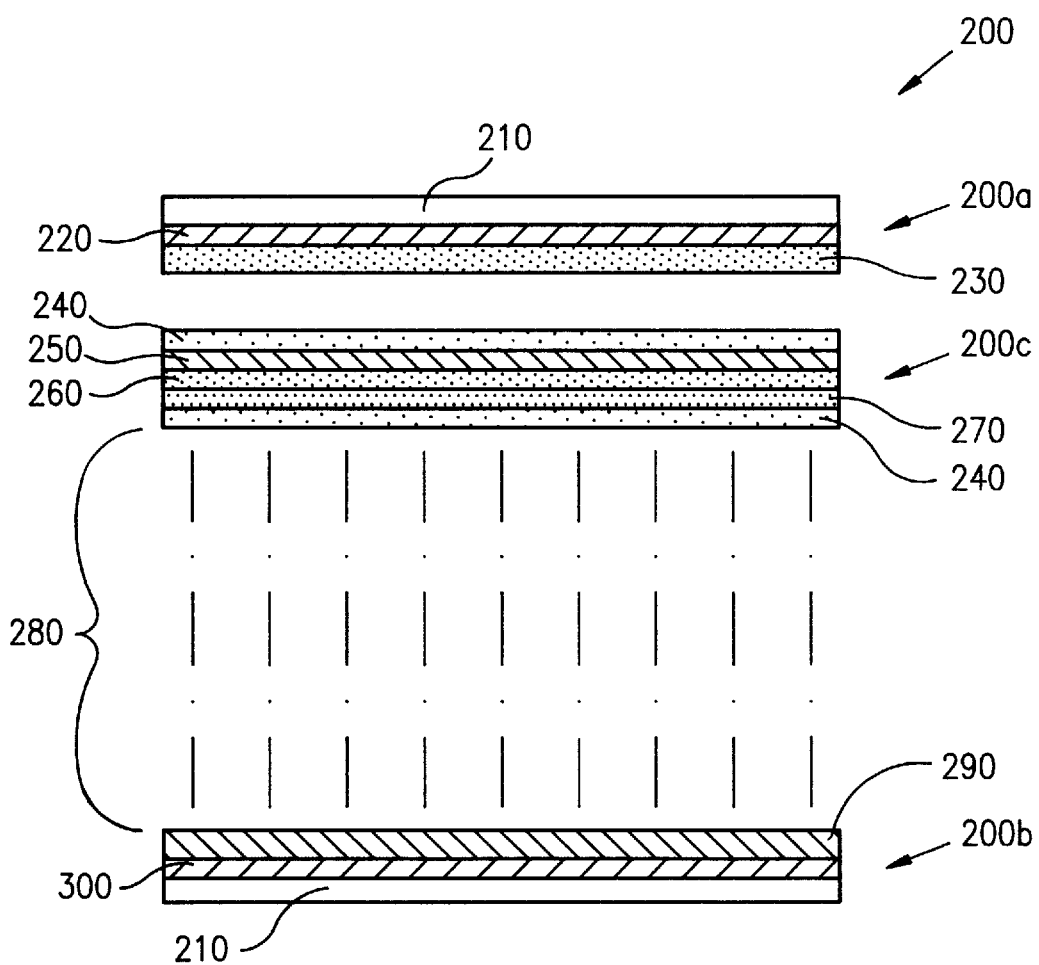
FIG. 3 is an exploded sectional side view of a capacitor structure in which a polymer substrate of an electrode is impregnated with an electronically conductive element inert to the active electrode and metallized on both sides of the substrate without a margin.

Alternatively, the polymer substrate of an electrode may be impregnated with an electronically conductive element that is inert to the active electrode and metallized on both sides of the substrate without a margin (illustrated in FIG. 3). Such electronically conductive element could include conductive carbon, electronically conducting polymers, e.g., polypyrrole, polyacetylene, polyanilene, etc., or it could be finely ground, dispersed metal impregnated into the polymer substrate. The conductivity of these impregnated polymer substrates should be greater than $10^2$ S/cm. These designs of impregnated polymer substrates are particularly useful when the active electrode material is coated on both sides of the metallized plastic current collector or when bipolar half-elements are constructed. These impregnated polymer substrates are used in bipolar plates in a bipolar capacitor design and/or in monopolar capacitor design. In both cases, however, the electrode terminations are not end-sprayed at the electrode edges, as shown in FIG. 2, but instead are end sprayed on the respective anode and cathode end units (not shown).

It is preferable that the monopolar capacitors not have the impregnated polymer substrates, so as to facilitate end-spraying for end terminations. However, the impregnated substrates are highly desirable for bipolar designs. When impregnated substrates are used, no unmetallized margins are included. In addition, metallization of the impregnated polymer substrate is optional. Typical metallization material is aluminum. However, copper, nickel, titanium, inconel, stainless steel, zinc, carbon, gold, or any compatible metallization with the overlying active electrode material will suffice. The chosen thickness of the metallic layer depends upon the particular conductivity requirement and the desired resistivity of the metal.

A bipolar structure is fabricated by laminating anode and cathode active elements on respective opposite sides of this conductive substrate. Preferably, the electrode layers are in a range of thickness from 0.1–50 microns. For bipolar structures, the composite active cathode or anode is preferably screen-printed onto the substrate element, but one of the above-described techniques for applying active electrode composite may be used instead.

The present invention thus provides very thin film, strong, and yet flexible and highly conductive polymeric electrolyte and electrode structures, similar to film capacitor dielectric material that can be tightly wound in formation of the capacitor.

Figure 4:
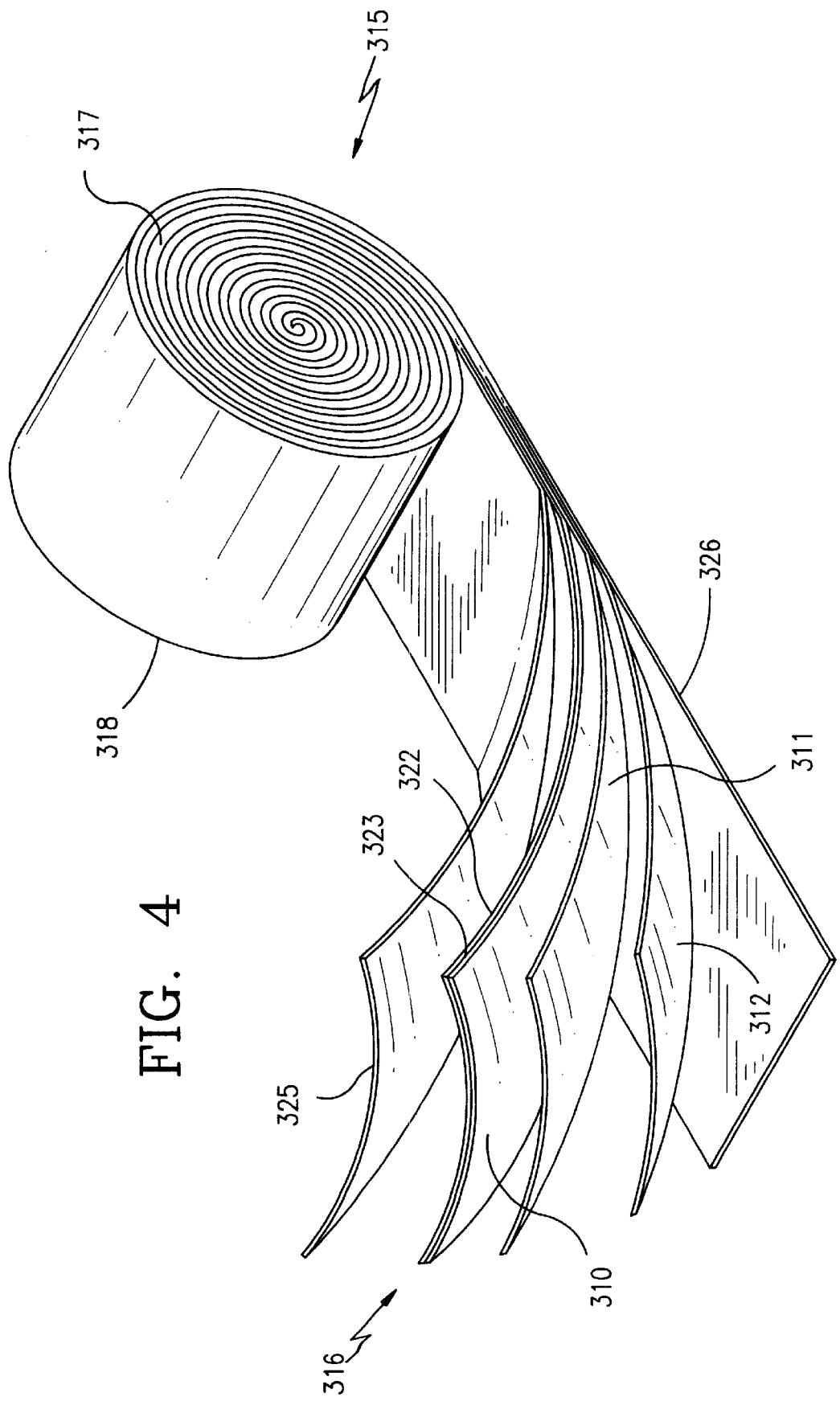
FIG. 4 is a perspective view of a wound electrochemical capacitor, illustrating its principal webs including an anode, a hybrid polymer electrolyte film, and a cathode.

Referring to FIG. 4, several webs are wound together in an electrochemical capacitor structure. In particular, in this exemplary embodiment three principal webs, comprising anode 310, hybrid polymer electrolyte film 311 and cathode 312, are wound in the manner illustrated in the Figure, or, alternatively, may be stacked or laminated, to form electrochemical capacitor 315. A tightly wound construction removes air from between the layers, and allows enhanced and continuous contact between the layers. Care must be exercised to avoid electrical shorting of the beginning of the turns. The tightly wound capacitor is taped at the edge 326, and may then be strapped in a tray (not shown) which is open on both sides. This provides access to both ends 317 and 318 of the capacitor 315 for schooping or, preferably, metal spraying thereof, first with a high zinc content solder (harder material) followed by a regular softer "Babbitt" end spray solder (90% tin: 10% zinc). The first end spray scratches the metallized surface and creates a trough to build a better electrical and mechanical contact. The tight wind and offset spacing prevents the zinc from penetrating to the active components. This combination of end sprays also allows better contact adhesion with the final terminations.

Subsequently, aluminum leads (not shown) are soldered onto each of the ends 317 and 318 to form the final termination. The capacitor 315 may then be epoxied to maintain pressure on the cell as well as to protect it further from humidity, and subsequently heated to about 80° C. for a period of from 2 to 5 minutes, to improve the interface. If desired, it may be heated under vacuum before epoxying, to improve the interface even further.

It will thus be recognized that polymer electrolytes fabricated in very thin film form can be used with thin film anode and cathode electrodes. By designing an electrochemical capacitor based on very thin film active and inactive components, the surface area of the active plates can be effectively increased to provide the capacitor with higher current drain capability, lower resistance, higher energy content, lower leakage, wide operating temperature range, higher efficiency, higher capacity utilization, greater cycle life, and improved reliability and safety. Furthermore, when designed around very thin metallized polymer films (1 micron) as the substrate material, the energy density may be expected to improve by at least 25 to 40% over state-ofthe-art electrochemical capacitors, with reduced cost. A method of producing cells with the above attributes is to manufacture very thin film cell components, and once the individual cell components have been laminated, the finished cell is heated to about 60–80° C. for about 2 hours. This enhances the electrode/electrolyte interface and allows better interfacial adhesion and improved cyclability.

Although certain preferred embodiments and methods have been disclosed herein, it will be appreciated by those skilled in the art to which the invention pertains, from a consideration of the foregoing description, that variations and modifications may be made without departing from the spirit and scope of the invention. Accordingly, it is intended that the invention shall be limited only by the appended claims and the rules and principles of applicable law.

What is claimed is:

1. An electrochemical capacitor, comprising an ionically conductive polymer thin film, liquid electrolyte retained in said thin film, and thin flexible active electrode layers constituting an anode and a cathode composed of energy dense material of high intrinsic surface area positioned at either side of said thin film to tightly sandwich said electrolyte-retaining thin film therebetween.

2. The electrochemical capacitor of claim 1, wherein said electrode layers have a thickness in a range from about 1 micron to about 100 microns.

3. The electrochemical capacitor of claim 1, wherein said electrode layers comprise an electrode active material blended with a polymer electrolyte.

4. An electrochemical capacitor, comprising an ionically conductive polymer thin film, a liquid electrolyte retained in said thin film, and thin flexible active electrolyte layers constituting an anode and a cathode composed or energy dense material of high intrinsic surface area positioned at either side of said thin film to tightly sandwich said electrolyte-retaining thin film therebetween, wherein said energy dense material consists of at least one first group material possessing properties of high exchange current density, intrinsically high surface area, and high charge capacity in combination with at least one second group material essentially having exceptionally high redox capacity.

5. The electrochemical capacitor of claim 4, wherein said energy dense material has a composition comprising about 1% to 99% by weight of said energy dense material of said first group material and the remainder of said energy dense material comprising said second group material.

6. The electrochemical capacitor of claim 4, wherein said first group material is based on activated carbon.

7. The electrochemical capacitor of claim 4, wherein said first group material comprises valve metal oxide selected from the group consisting of oxides of titanium, zirconium, hafnium, niobium, tantalum, molybdenum, tungsten, ruthenium, iridium, platinum, palladium, osmium, gold, and rhenium.

8. The electrochemical capacitor of claim 7, wherein said second group material comprises battery active material selected from the group consisting of oxides, sulfides and selenides, including any of $MnO_2$, $LiMn_2O_4$, $Li_xMnO_2$, $MoS_2$, $MoS_3$, $MoV_2O_8$, $CoO_2$, $Li_xCoO_2$, $V_6O_{13}$, $V_2O_5$, $V_3O_8$, $VO_2$, $V_2S_5$, $TiS_2$, $NbSe_3$, $Cr_2O_5$, $Cr_3O_8$, $WO_3$, $Li_xNiO_2$, $Li_xN_yCo_zO_2$, $Li_xNi_yMn_zO_2$, $Li_xCo_yMn_zO_2$, and lithium doped electronically conducting polymers including polypyrrole, polyaniline, and polyacetylene.

9. The electrochemical capacitor of claim 4, wherein said first group material is physically mixed with said second group material as said energy dense material in said electrode layers to enhance the discharge time of said capacitor.

10. A thin film electrochemical capacitor, comprising a resilient flexible ionically conductive polymeric thin film including a base polymer with inorganic filler dispersed therein to increase surface area and porosity of said polymeric thin film; a liquid electrolyte composed of liquid polymer, organic solvent electrolyte and a salt in solution impregnated in said polymeric thin film to form a gelled thin film polymer electrolyte; and a pair of spaced-apart flexible thin film electrodes, each of said electrodes adhered to a current collector thereon, wherein said polymeric thin film is tightly sandwiched between said pair of thin film electrodes.

11. The thin film electrochemical capacitor of claim 10, wherein said polymer electrolyte is a cation conductor.

12. The thin film electrochemical capacitor of claim 10, wherein said polymer electrolyte is dimensionally stable and of high mechanical strength.

13. The thin film electrochemical capacitor of claim 10, wherein said polymer electrolyte is temperature stable up to 120° C.

14. The thin film electrochemical capacitor of claim 10, wherein said polymer electrolyte is in the form of a very thin film.

15. The thin film electrochemical capacitor of claim 10, wherein said polymer electrolyte has low resistance and high flexibility.

16. The thin film electrochemical capacitor of claim 10, wherein each said current collector is a very thin structure chosen from the group consisting of metallic elements 1 to 10 $\mu$m thick and metallized plastics 0.5 to 50 $\mu$m thick.

17. The thin film electrochemical capacitor of claim 10, wherein each said current collector is a metallic current collector selected from the group consisting of aluminum, nickel, copper, titanium, stainless steel, and an alloy including inconel.

18. The thin film electrochemical capacitor of claim 10, wherein said base polymer has a predominantly amorphous structure.

19. A thin film electrochemical capacitor, comprising a resilient flexible ionically conductive polymeric electrolyte thin film including a base polymer with inorganic filler dispersed therein to increase surface area and porosity of said polymeric thin film; a liquid electrolyte composed of liquid polymer, organic solvent electrolyte and a salt in solution impregnated in said polymeric thin film; and a pair of spaced-apart flexible thin film electrodes, each of said electrodes adhered to a current collector thereon, wherein said polymeric electrolyte thin film is tightly sandwiched between said pair of thin film electrodes, wherein each said current collector is a metallized polymer current collector comprising a polymer substrate about 0.5–50 $\mu$m thick and a metallization layer up to 1 $\mu$m thick overlying at least a portion of said polymer substrate.

20. The thin film electrochemical capacitor of claim 19, wherein said polymer substrate of each of said thin film electrodes is selected from a group of polymers including PET, PP, PPS, PEN, PVDF and PE, said metallization layer on each said polymer substrate forming an electrically conductive layer thereon.

21. The thin film electrochemical capacitor of claim 20, wherein each metallized polymer substrate has a thickness in a range from about 0.5 micron to about 50 microns.

22. The thin film electrochemical capacitor of claim 20, wherein each said metallization layer is selected from a group consisting of aluminum, copper, nickel, titanium, inconel, stainless steel, zinc, gold, and carbon.

23. The thin film electrochemical capacitor of claim 20, wherein each said electrode is a valve metal oxide.

24. The thin film electrochemical capacitor of claim 23, wherein each said metallization layer is titanium.

25. The thin film electrochemical capacitor of claim 24, wherein each said valve metal oxide is $RuO_2$.

26. A thin film electrochemical capacitor, comprising a resilient flexible ionically conductive polymeric electrolyte thin film including a base polymer with inorganic filler dispersed therein to increase surface area and porosity of said polymeric thin film; a liquid electrolyte composed of liquid polymer, organic solvent electrolyte and a salt in solution impregnated in said polymeric thin film; and a pair of spaced-apart flexible thin film electrodes, each of said electrodes adhered to a current collector thereon, wherein said polymeric electrolyte thin film is tightly sandwiched between said pair of thin film electrodes, wherein each of said thin film electrodes comprises a layer of polymer material, and a low resistance metallization layer having a conductivity in a range from about 0.01 ohm per square to about 1 ohm per square overlying and adhered to a side of said layer of polymer material.

27. The thin film electrochemical capacitor of claim 26, wherein each of said thin film electrodes has a thickness in a range from about 0.5 micron to about 50 microns.

28. The thin film electrochemical capacitor of claim 26, wherein each said layer of polymer material has a non-metallized margin with a width in a range from about one mm to about three mm.

29. The thin film electrochemical capacitor of claim 28, wherein each said layer of polymer material has a low resistance metallization layer of said conductivity adhered to each side thereof, and both sides of said layer of polymer material have a non-metallized margin with said width at the same edge of said layer of polymer material.

30. The thin film electrochemical capacitor of claim 29, wherein active electrode material is applied over said low resistance metallization layer on each said layer of polymer material and not on said non-metallized margin of said layer of polymer material.

31. The thin film electrochemical capacitor of claim 30, wherein said active electrode material comprises $RuO_2$.

* * * * *